(12) United States Patent
Tanaka et al.

(10) Patent No.: US 6,308,013 B1
(45) Date of Patent: *Oct. 23, 2001

(54) CONVERTER UNIT OF CAMERA

(75) Inventors: Minoru Tanaka; Shigeru Yamamoto, both of Omiya (JP)

(73) Assignee: Fuji Photo Optical Co., Ltd., Omiya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,958

(22) Filed: Mar. 3, 1999

(30) Foreign Application Priority Data

Mar. 5, 1998 (JP) ................................. 10-053776

(51) Int. Cl.$^7$ .................................................. G03B 17/00
(52) U.S. Cl. ............................................. 396/74; 359/694
(58) Field of Search ................................. 396/72, 73, 74, 396/75; 359/694

(56) References Cited

U.S. PATENT DOCUMENTS

| | | | |
|---|---|---|---|
| 4,482,228 | * 11/1984 | Fujita | 396/73 |
| 4,525,050 | * 6/1985 | Ohashi | 396/75 |
| 4,573,780 | * 3/1986 | Sato et al. | 396/75 |
| 4,825,235 | * 4/1989 | Wakabayashi et al. | 396/75 |
| 4,887,107 | * 12/1989 | Nakamura et al. | 396/75 |
| 5,696,634 | * 12/1997 | Watanabe et al. | 359/694 |
| 5,751,353 | * 5/1998 | Tanaka et al. | 348/335 |

FOREIGN PATENT DOCUMENTS

| | | |
|---|---|---|
| 8-171043 | 7/1996 | (JP) . |
| 11-101933 | 4/1999 | (JP) . |

* cited by examiner

*Primary Examiner*—David M. Gray
(74) *Attorney, Agent, or Firm*—Nixon Peaboy LLP; David S. Safran

(57) ABSTRACT

A converter unit for a lens unit of a camera, which is able to match optical axes of a plurality of kinds of converter lenses with different magnifications, which are revolvably mounted on a rod, with an optical axis of the lens unit properly. One of the converter lenses is revolvably mounted on the rod by two bearings through a connecting member. One of the bearings is attached on an eccentric external circumference of a collar member attached on the rod. The rotation of the collar member adjusts an eccentric direction of the collar member and the direction of an optical axis of the converter lens.

9 Claims, 5 Drawing Sheets

CONVERTER UNIT OF CAMERA

BACKGROUND OF THE INVENTION

1. Field of the Invention

The present invention relates generally to a converter unit of a camera, and more particularly to a converter unit of a camera, which is capable of adjusting optical axes of converter lenses that are inserted into an optical path of a lens unit of the camera.

2. Description of Related Art

According to a conventional converter unit of a lens unit for a broadcasting TV camera, an external control lever, etc. is operated to insert a converter lens into an optical path of the lens unit to thereby alter the focal length of the lens unit. For example, when a 2× extender lens enters the optical path of the lens unit, the focal length of the lens unit is doubled.

Recently, in the field of broadcasting TV cameras, there is a camera capable of selectively switching the aspect ratios between 4:3 and 16:9. In this switchable camera, a charge-coupled device (CCD) of the aspect ratio 16:9 is used for an imaging device. When the aspect ratio is set at 4:3, the right and left areas of the CCD are unused and only the area with the aspect ratio 4:3 at the center is used. Accordingly, the angle of view is reduced by approximately 20%, and the focal length of the lens unit appears to become longer.

To eliminate the above-mentioned disadvantage, it is proposed that an approximately 0.8×converter lens, which is called a ratio converter lens, is arranged on the optical path of the lens unit to compensate the focal length of the lens unit when the aspect ratio is set at 4:3.

Moreover, there is a conventional converter unit that is provided with the extender lens and the ratio converter lens to extend the focal length of the lens unit and compensate the focal length on the aspect ratio 4:3. The extender lens extends the focal length of the lens unit whereas the ratio converter lens contracts it. Both the extender lens and the ratio converter lens, however, are converter lenses for altering the focal length of the lens unit, and they are constructed in the same manner.

The applicants have proposed a converter unit that includes two kinds of extender lenses in Japanese Patent Provisional Publication No. 8-171043. According to this converter unit, the extender lenses are revolvably mounted on a single rod in order to simplify the structure, and a desired extender lens is revolved as the need arises and enters and leaves the optical path of the lens unit. One of the applicants has proposed the same in the case that one of the extender lenses is the ratio converter lens in Japanese Patent Provisional Publication No. 9-264077. According to these converter units, the optical axes of the extender lenses are adjusted at the same time by adjusting the direction of the single rod when the extender lenses are inserted into the optical path of the lens unit.

It is, however, difficult to adjust the optical axes of both the extender lenses at the same time by adjusting the direction of the single rod. For this reason, the optical axis of one of the extender lenses that is more sensitive or of a higher magnification is priorly adjusted in the past, but in this case, the optical axis of the other extender lens with the lower magnification (or the ratio converter lens) greatly deviates.

SUMMARY OF THE INVENTION

The present invention has been developed in view of the above-described circumstances, and has as its object the provision of a converter unit for a lens unit of a camera, which is able to match optical axes of a plurality of kinds of converter lenses with different magnifications, which are revolvably mounted on a rod, with an optical axis of the lens unit properly.

To achieve the above-mentioned object, the present invention is directed to a converter unit for a lens unit of a camera, comprising: a rod fixed in a body of the converter unit; a cylindrical collar member perforated with a hole, an external circumference of the collar member being eccentric with the hole, the rod being inserted in the hole; and a converter lens revolvably mounted on the external circumference of the collar member, the converter lens being revolved to enter and leave an optical path of the lens unit to alter focal length of the lens unit.

According to the present invention, the converter lens is revolvably mounted on the eccentric external circumference of the cylindrical collar member attached on the rod, and the collar member is rotated to adjust the eccentric direction of the eccentric external circumference, thereby adjusting the direction of the revolving axis of the converter lens. It is therefore possible to match the optical axis of the converter lens with the optical axis of the lens unit.

The present invention is directed to the converter unit further comprising a second converter lens revolvably mounted on the rod, the second converter lens being revolved to enter and leave the optical path of the lens unit to alter the focal length of the lens unit. The converter lens mounted on the collar member preferably has higher magnification than the second converter lens mounted on the rod. The collar member is rotated to independently adjust the optical axis of the converter lens with the higher magnification. Therefore, the optical axis of the converter lens with the higher magnification, which requires the accurate adjustment of the optical axis thereof, can be adjusted properly without affecting the optical axis of the converter lens with the lower magnification, which can be sufficiently accurate if the rod is attached accurately. Consequently, the optical axes of the converter lenses are properly matched with the optical axis of the lens unit.

In addition, the converter unit may further comprise a second cylindrical collar member perforated with a hole, an external circumference of the second collar member being eccentric with the hole of the second collar member, the external circumference of the second collar member being supported in the body of the converter unit; wherein the rod is inserted in the hole of the second collar member and fixed in the body of the converter unit through the second collar member. Thus, the first eccentric collar member adjusts only the optical axis of one of the converter lenses, and the second eccentric cylindrical member adjusts the direction of the rod. It is therefore possible to separately adjust the optical axes of the two kinds of converter lenses.

The present invention is also directed to a converter unit for a lens unit of a camera, comprising: a cylindrical collar member perforated with a hole, an external circumference of the collar member being eccentric with the hole, the external circumference of the collar member being supported in a body of the converter unit; a rod inserted in the hole of the collar member; and a converter lens revolvably mounted on the rod, the converter lens being revolved to enter and leave an optical path of the lens unit to alter focal length of the lens unit.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
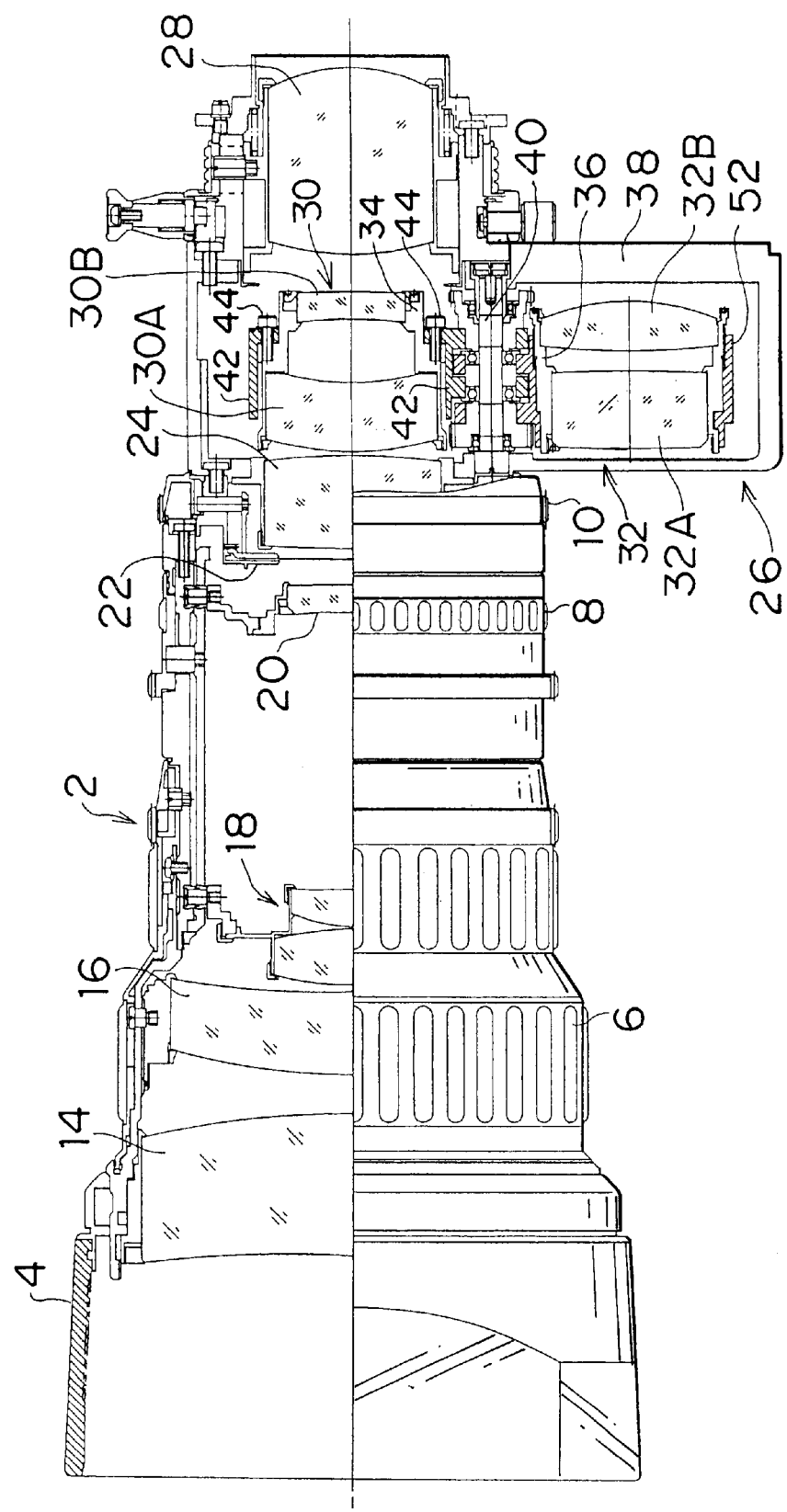
FIG. 1 is a partial sectional view illustrating the appearance and inner structure of a zoom lens for a TV camera, to which a converter unit according to the first embodiment of the present invention is applied.

FIG. 1 is a partial sectional view illustrating the appearance and inner structure of a zoom lens unit (an ENG lens unit) for a TV camera, to which a converter unit according to the first embodiment of the present invention is applied. The ENG lens unit in FIG. 1 is an inner focus zoom lens, which is used for a TV camera such as an ENG camera. A lens hood 4 is attached to the front of a lens body 2, and a focus ring 6, a zoom ring 8 and an iris ring 10 are arranged on the circumferential surface of the lens body 2.

A fixed focus lens group 14, a movable focus lens group 16, a variator lens system 18, a compensator lens system 20, an iris 22 and a relay lens 24 are provided within the lens body 2, and an converter unit 26 is provided behind them. A master lens 28 is arranged behind the converter unit 26.

For example, the converter unit 26 comprises a double extender 30 including lenses 30A & 30B and a ratio converter of approximately 0.8× including lenses 32A & 32B. The ratio converter 32 is provided for a camera that is capable of switching the aspect ratios between 16:9 and 4:3. Lens holding frames 34 & 36 hold the extender 30 and the ratio converter 32, respectively, and the lens holding frames 34 & 36 are revolvably mounted on a rod 40 in a case 38 of a body of the converter unit 26. In FIG. 1, the extender 30 is arranged on the optical path of the ENG lens unit.

Figure 2:
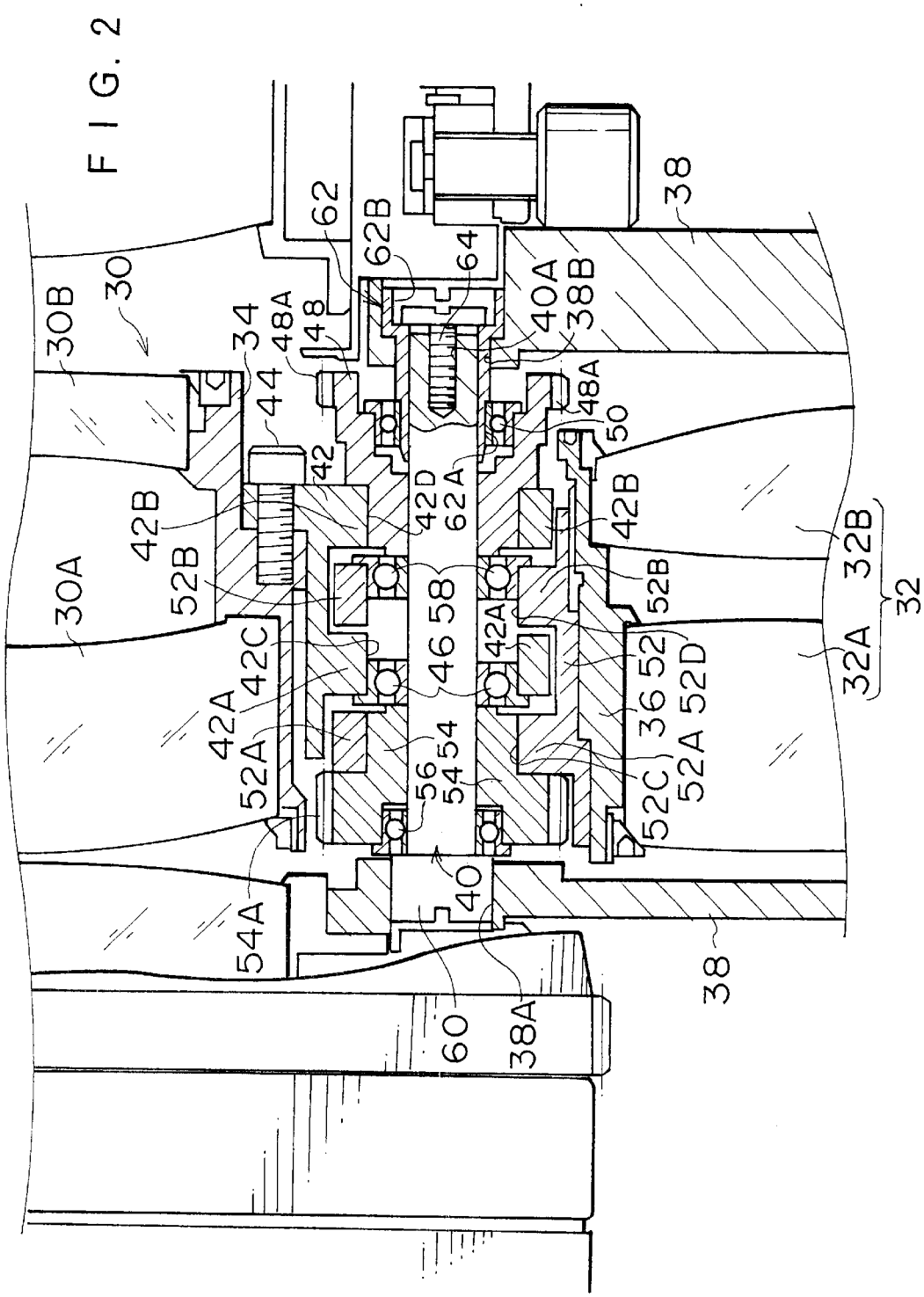
FIG. 2 is an enlarged view illustrating the essential parts of the inner structure of the converter unit in FIG. 1.

FIG. 2 is an enlarged view illustrating the essential parts of the inner structure of the converter unit 26. As shown in FIG. 2, the lens holding frame 34 of the extender 30 is fixed to a cylindrical connecting member 42 by screws 44 (see FIG. 1), and the lens holding frame 34 is mounted on the rod 40 through the connecting member 42. The connecting member 42 has a pair of projecting bearing parts 42A & 42B, and holes 42C & 42D are formed in the bearing parts 42A & 42B, respectively. The rod 40 is inserted in the holes 42C & 42D. The bearing part 42A is rotatably supported by the rod 40 through a bearing 46, which is provided between the internal circumference of the hole 42C and the rod 40. The bearing part 42B is secured to the external circumference of a cylindrical member 48 provided with a gear 48A. The cylindrical member 48 is rotatably mounted on the rod 40 through a bearing 50.

Accordingly, the rotation of the cylindrical member 48 through the gear 48A revolves the extender 30 around the rod 40 so that the extender 30 can enter and leave the optical path of the ENG lens unit. The gear 48A of the cylindrical member 48 engages with a gear train (not illustrated), which is driven by an extender switch lever (not illustrated) provided outside the case body 38. When the cameraman operates the extender switch lever, the cylindrical member 48 rotates to insert and extract the extender 30 into and from the optical path of the ENG lens unit. When the extender 30 enters the optical path of the ENG lens, the focal length of the ENG lens appears 2 times if the aspect ratio of the TV camera is 16:9 and the focal length appears 2.4 times if the aspect ratio is 4:3.

The lens holding frame 36 of the ratio converter 32 is screwed in a cylindrical connecting member 52 (see FIG. 1), and the lens holding frame 36 is mounted on the rod 40 through the connecting member 52. The connecting member 52 has a pair of projecting bearing parts 52A & 52B as is the case with the connecting member 42. Holes 52C & 52D are formed in the bearing parts 52A & 52B, respectively, and the rod 40 is inserted in the holes 52C & 52D. The bearing part 52A is secured to the external circumference of a cylindrical member 54 provided with a gear 54A. The cylindrical member 54 is rotatably mounted on the rod 40 through a bearing 56. The bearing part 52B is rotatably supported by the rod 40 through a bearing 58, which is provided between the internal circumference of the hole 52D and the rod 40. The bearing parts 52A & 52B of the connecting member 52 are arranged alternately with the bearing parts 42A & 42B of the connecting member 24.

Accordingly, the rotation of the cylindrical member 54 through the gear 54A revolves the ratio converter 32 around the rod 40 so that the ratio converter 32 can enter and leave the optical path of the ENG lens unit. The gear 54A of the cylindrical member 54 engages with a gear train (not illustrated), which is driven by a ratio converter switch lever (not illustrated) provided outside the case body 38. When the cameraman operates the ratio converter switch lever, the cylindrical member 54 rotates to insert and extract the ratio converter 32 into and from the optical path of the ENG lens unit. When the ratio converter enters the optical path of the ENG lens in the case that the aspect ratio is 4:3, the horizontal angle of view is 1×.

The rod 40 is inserted in the case body 38 through an insertion hole 38A formed in the case body 38. The back end of the rod 40 is inserted in a hole 38B formed at the opposite side of the insertion hole 38A. A support part 60 at the front end of the rod 40 is fixed in the insertion hole 38A by an adhesive, or the like.

Figure 5:
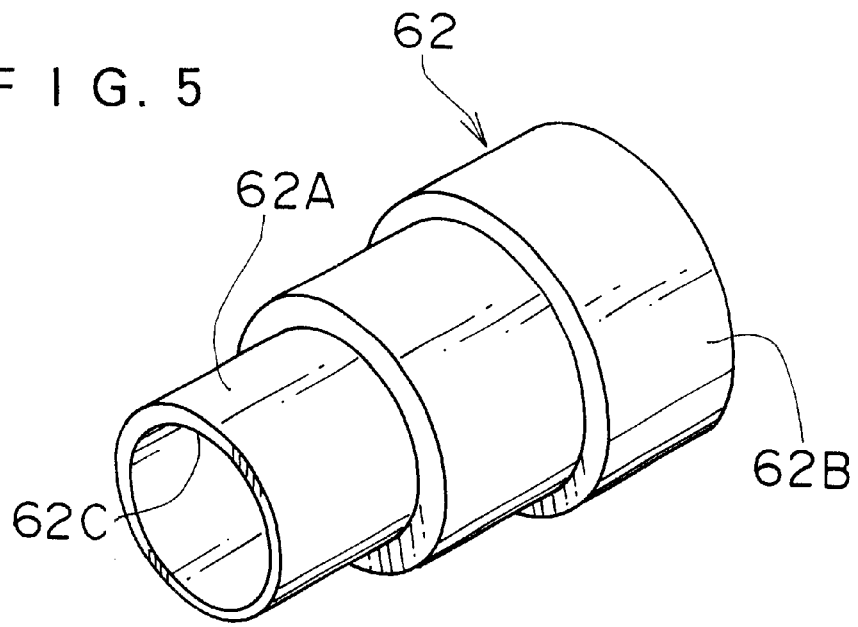
FIG. 5 is a perspective view illustrating the shape of a collar.
Figure 6:
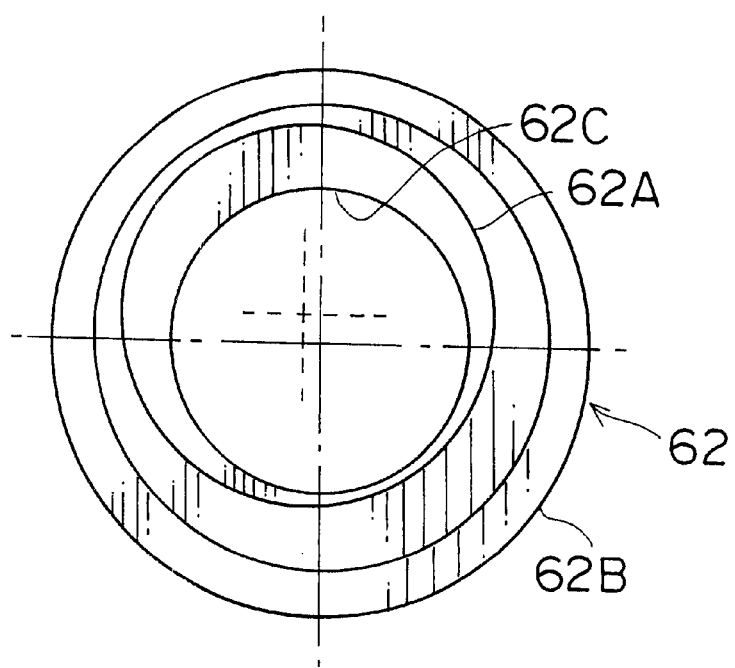
FIG. 6 is a front view illustrating the shape of the collar.

On the other hand, a cylindrical collar 62 is inserted between the back end of the rod 40 and the hole 38B. The diameter of the collar 62 extends at the back end thereof. The collar 62 fills the gap between the rod 40 and the hole 38B, and prevents the shake of the rod 40 in horizontal and vertical directions. The front end of an eccentric part 62A of the collar 62 extends to the internal circumference of the bearing 50, which supports the cylindrical member 48. The eccentric part 62A of the collar 62 has a cylindrical surface at the external circumference thereof as shown in FIGS. 5 and 6, and the cylindrical surface is eccentric with a hole 62C, in which the rod 40 is inserted. More specifically, the bearing 50 rotates around an axis that is eccentric with the axis of the rod 40. Therefore, the extender 30 revolves around a different axis from the axis of the rod 40 in accordance with the eccentric direction of the eccentric part 62A. A kerf is formed on a diameter extending part 62B at the back end of the collar 62. After the collar 62 is fitted on the rod 40, a tip of a screwdriver, etc. is fitted into the kerf and the collar 62 is rotated on the rod 40 to thereby adjust the eccentric direction of the eccentric part 62A of the collar 62. This adjusts the optical axis of the extender 30 that is arranged on the optical path of the ENG lens unit.

A screw hole 40A is formed in the back end face of the rod 40, and a screw 64 is screwed in the screw hole 40A. The head of the screw 64 presses the collar 62 and thus is a fixing member which fixes the cylindrical collar member on the rod after adjusting the eccentricity of the collar to thereby fix the adjustment of the optical axis of the extender 30.

According to the conventional converter unit, the optical axes of the extender 30 and the ratio converter 32 are adjusted at the same time by adjusting the direction of the rod 40. For this reason, even if one optical axis is adjusted properly, the other optical axis becomes deviated. In particular, if the extender 30 has a high magnification, which requires the accurate adjustment of the optical axis, the optical axis of the extender 30 is adjusted primarily, and the optical axis of the low-magnification converter 32 deviates too much. If the eccentric collar 62 according to the embodiment of the present invention is used, it is possible to independently adjust the optical axis of the extender 30, which requires the accurate adjustment of the optical axis, without giving any adversary effects on the optical axis of the ratio converter 32, which is adjusted enough if the rod 40 is attached accurately.

In the first embodiment, the converter unit 26 has the 2× extender 30 and the 0.8× ratio converter 32. The present invention, however, may also be applied to the converter unit that has extenders with two arbitrary magnifications (the high magnification and the low magnification). In the case of the converter unit provided with only one extender or ratio converter, although the above-stated problem does not occur if the optical axis thereof is adjusted by tilting the rod, the eccentric collar may be used to adjust the optical axis of the lens as is the case with the first embodiment.

Figure 3:
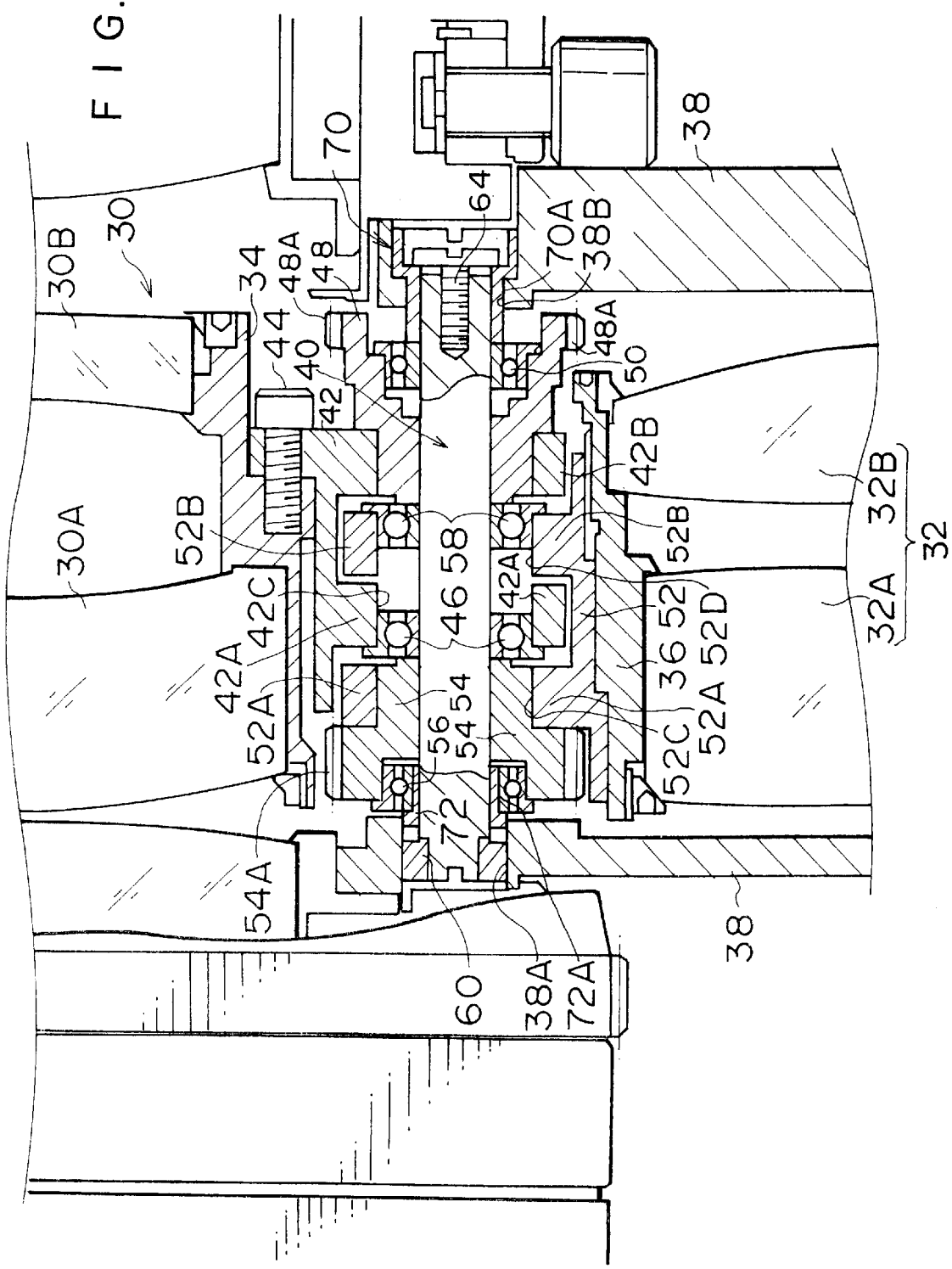
FIG. 3 is an enlarged view illustrating the essential parts of the inner structure of a converter unit according to the second embodiment of the present invention.

A description will now be given of the second embodiment wherein it is possible to adjust not only the optical axis of the extender 30 but the optical axis of the ratio converter 32. FIG. 3 is an enlarged view illustrating the essential parts of the second embodiment wherein the optical axis of the extender 30 and the optical axis of the ratio converter 32 are adjusted separately. Parts similar to those described with reference to FIG. 1 or 2 are denoted by the same reference numerals, and they will not be explained. An eccentric collar 70 with an eccentric part 70A, of which external circumference is eccentric as the eccentric part 62A of the collar 62, is inserted between the back end of the rod 40 and the hole 38B of the case body 38 as shown in FIG. 3. Unlike the collar 62 in FIG. 2, the collar 70 is used to adjust the direction of the rod 40. The eccentric direction of the eccentric part 70A of the collar 70 is adjusted to adjust the direction of the rod 40 to thereby adjust the optical axis of the extender 30.

On the other hand, an eccentric collar 72 with an eccentric part 72A is attached to the internal circumference of the bearing 56, which supports the ratio converter 32 revolvably. Accordingly, adjusting the eccentric direction of the eccentric part 72A of the collar 72 adjusts the optical axis of the ratio converter 32.

By the above-described arrangements, the optical axes of the extender 30 and the ratio converter 32 can be adjusted separately.

Figure 4:
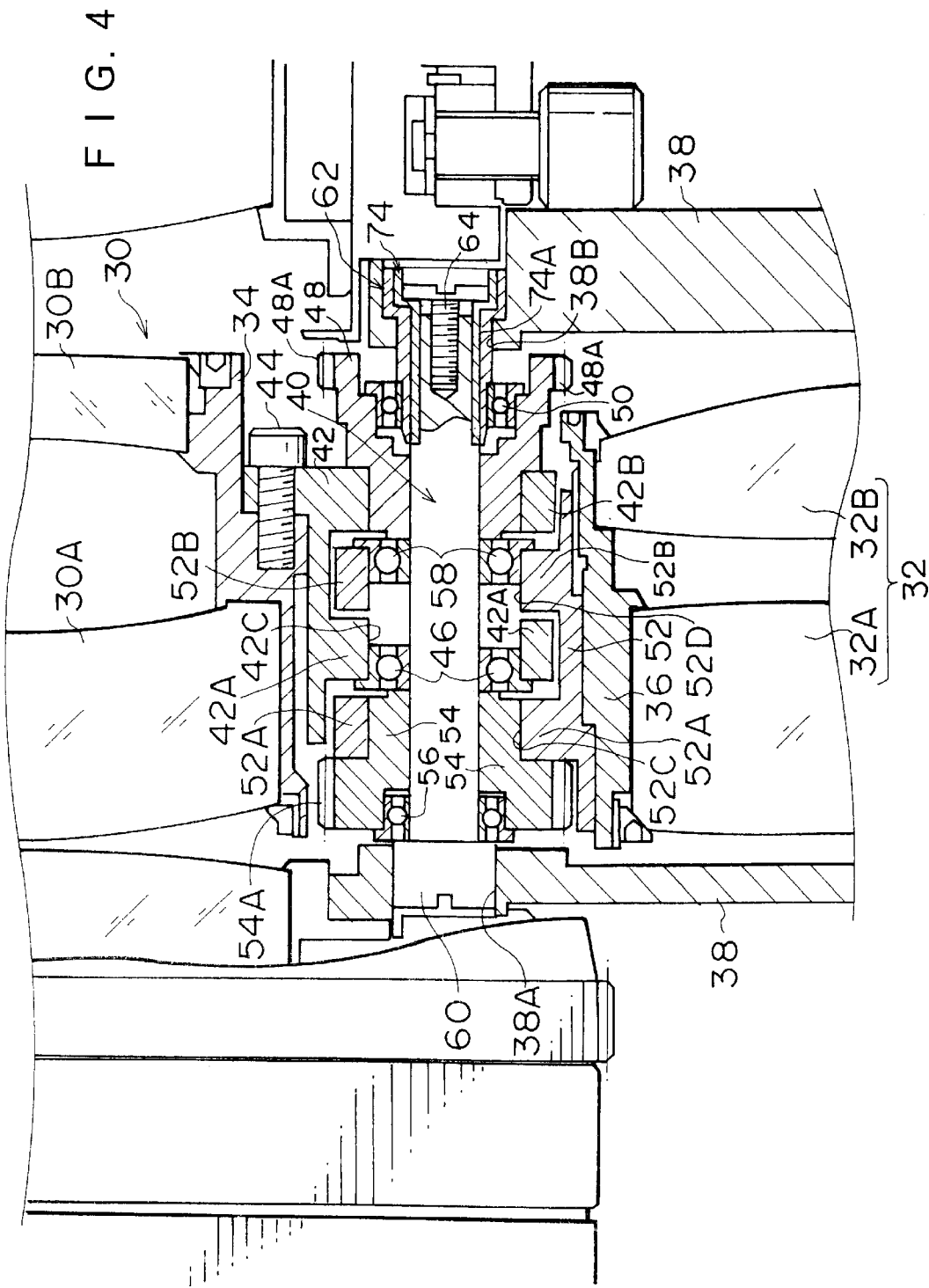
FIG. 4 is an enlarged view illustrating the essential parts of the inner structure of a converter unit according to the third embodiment of the present invention.

FIG. 4 is an enlarged view illustrating the essential parts of the third embodiment wherein the optical axis of the extender 30 and the optical axis of the ratio converter 32 are adjusted separately. Parts similar to those described with reference to FIG. 1 or 2 are denoted by the same reference numerals, and they will not be explained. As shown in FIG. 4, an eccentric collar 74 with an eccentric part 74A is inserted in the eccentric collar 62. The diameter of the rod 40 contracts at the back end thereof by the thickness of the collar 74. Rotating the collar 74 to adjust the eccentric direction of the eccentric part 74A adjusts the direction of the rod 40 and the optical axis of the ratio converter 32. On the other hand, the optical axis of the extender 30 can be adjusted by the collar 62 as is the case with the first embodiment described with reference to FIG. 2.

In the embodiment of FIG. 4, the first lenses of the converter unit 26 (i.e., extender lenses 30A, 30B) are mounted on the eccentric portion 62C of the cylindrical collar member 62 via the cylindrical member 48 and bearing 50, so that the optical axis of the lenses 30A, 30B can be shifted by rotation of the collar member 62. The second lenses of the converter unit 26 (i.e., converter lenses 32A, 32B) are mounted on a portion of the rod 40 which extends outwardly from the hole 62C of the collar member 62. The second collar member 74 is mounted within the cylindrical collar member 62 between the cylindrical collar member 62 and the rod 40, and has an eccentric portion 74A which shifts the rod 40 relative to the cylindrical collar member upon rotation of the second collar member 74 within the cylindrical collar member 62. This arrangement enables the optical axis of the second converter lenses 32A, 32B to be adjusted separately from the optical axis of the first of the converter lenses (extender lenses 30A, 30B).

As set forth hereinabove, according to the converter unit for the lens unit of the present invention, the converter lens is revolvably mounted on the eccentric external circumference of the collar member attached to the rod, and the collar member is rotated to adjust the eccentric direction of the external circumference thereof. This adjusts the direction of the revolving axis of the converter lens. It is therefore possible to properly match the optical axis of the converter lens with the optical axis of the lens unit.

When the two converter lenses with different magnifications are mounted on the rod, the converter lens with the higher magnification is revolvably mounted on the external circumference of the collar member. Then, the collar member is rotated in order to independently adjust the optical axis of the converted lens with the higher magnification. Therefore, the optical axis of the converter lens with the high magnification, which requires the accurate adjustment of the optical axis thereof, can be adjusted properly without affecting the optical axis of the converter lens with the lower magnification, which can be sufficiently accurate if the rod is attached accurately. Consequently, the optical axes of the converter lenses can properly be matched with the optical axis of the lens unit.

In addition, the collar member with the eccentric external circumference may adjust the optical axis of only one converter lens, and the other collar member may adjust the direction of the rod. It is therefore possible to separately adjust the optical axes of the two converter lenses.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A converter unit for a lens unit of a camera, comprising:

a rod fixed in a body of the converter unit;

a cylindrical collar member having a hole which extends axially therethrough, an external circumference of the collar member being eccentric relative to the hole, said rod extending through said hole with a portion of said rod being disposed outside of said hole;

a fixing member enabling fixing of the cylindrical collar member on the rod after adjusting a rotational position of the cylindrical collar;

a bearing unit having a first bearing mounting section which is disposed on an external circumference of said rod so as to revolve relative thereto, and a second bearing mounting section which is disposed on said external circumference of the collar member so as to revolve relative thereto; and a converter lens revolvably mounted on the external circumference of the collar member via said second bearing mounting section, the converter lens being revolved to enter and leave an optical path of the lens unit to alter focal length of the lens unit and the rotational position of the cylindrical collar being adjusted to shift an optical axis of the converter lens.

2. The converter unit as defined in claim 1, further comprising a second converter lens revolvably mounted on the rod, the second converter lens being revolved to enter and leave the optical path of the lens unit to alter the focal length of the lens unit.

3. The converter unit as defined in claim 2, wherein the converter lens mounted on the collar member has higher magnification than the second converter lens mounted on the rod.

4. The converter unit as defined in claim 1, further comprising:

a second collar member perforated with a hole, an external circumference of the second collar member being eccentric with the hole of the second collar member, the external circumference of the second collar member being supported in the body of the converter unit via said cylindrical collar member;

wherein the rod is inserted in the hole of the second collar member and fixed in the body of the converter unit via said first bearing mounting section.

5. A converter unit according to claim 2, wherein said second converter lens is mounted on the portion of said rod which is disposed outside of said hole via said first bearing mounting section; wherein a second collar member is mounted within said cylindrical collar member between said cylindrical collar member and said rod and has an eccentric portion which shifts the rod relative to the cylindrical collar member upon rotation of the second collar member within the cylindrical collar member, thereby enabling the optical axes of said converter lenses to be adjusted separately via separate rotation of the collar members.

6. A converter unit according to claim 1, wherein the collar member has a first portion and a second portion in axially spaced relationship to each other and through which said hole extends; wherein an external circumference of the first portion is eccentric relative to the hole and an external circumference of the second portion of the collar member is concentric relative to the hole; and wherein said rod passes through both of said first and second portions of the collar member within said hole.

7. A converter unit for a lens unit of a camera, comprising:

a cylindrical collar member having a hole which extends axially therethrough, an external circumference of an adjustment section of the collar member being eccentric relative to the hole, the external circumference of the adjustment section of the collar member being supported in a body of the converter unit;

a rod inserted in the hole of the collar member;

a bearing unit having a bearing mounting section which is disposed on said external circumference of the collar member so as to revolve relative thereto; and a converter lens revolvably mounted on the rod via the bearing mounting section, the converter lens being revolved to enter and leave an optical path of the lens unit to alter focal length of the lens unit and the rotational position of the cylindrical collar being adjusted to shift an optical axis of the converter lens.

8. A converter unit according to claim 7, wherein the collar member is a means for matching the optical axis of the converter lens to an optical axis of the lens unit.

9. A converter unit according to claim 7, wherein the collar member has a first portion and a second portion in axially spaced relationship to each other and through which said hole extends; wherein an external circumference of the first portion is eccentric relative to the hole and an external circumference of the second portion of the collar member is concentric relative to the hole; and wherein said rod passes through both of said first and second portions of the collar member within said hole.

* * * * *